US008340108B2

(12) United States Patent
O'Leary et al.

(10) Patent No.: US 8,340,108 B2
(45) Date of Patent: Dec. 25, 2012

(54) APPARATUS AND METHOD FOR SWITCH ZONING VIA FIBRE CHANNEL AND SMALL COMPUTER SYSTEM INTERFACE COMMANDS

(75) Inventors: Nicholas O'Leary, West End (GB); John Mark Clifton, Hertfordshire (GB)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 12/061,621

(22) Filed: Apr. 2, 2008

(65) Prior Publication Data
US 2008/0247405 A1 Oct. 9, 2008

(30) Foreign Application Priority Data
Apr. 4, 2007 (EP) .................................. 07105662.6

(51) Int. Cl.
*H04L 12/28* (2006.01)
(52) U.S. Cl. ......................................... 370/401; 709/223
(58) Field of Classification Search .................. None
See application file for complete search history.

(56) References Cited

U.S. PATENT DOCUMENTS

| | | |
|---|---|---|
| 6,765,919 B1 | 7/2004 | Banks et al. |
| 7,664,839 B1 * | 2/2010 | Karr et al. ...................... 709/223 |
| 7,685,261 B1 * | 3/2010 | Marinelli et al. ............. 709/220 |
| 2003/0055932 A1 | 3/2003 | Brisse |
| 2004/0080527 A1 | 4/2004 | Elliot |
| 2005/0213607 A1 * | 9/2005 | Cashman et al. ............. 370/467 |
| 2006/0136704 A1 | 6/2006 | Arendt et al. ..................... 713/2 |
| 2006/0248308 A1 * | 11/2006 | Wang et al. ................... 711/173 |
| 2007/0067589 A1 * | 3/2007 | Mishra et al. ................. 711/163 |
| 2007/0165660 A1 * | 7/2007 | Fang et al. .................... 370/410 |
| 2007/0220124 A1 * | 9/2007 | Golasky ........................ 709/223 |
| 2008/0162681 A1 * | 7/2008 | Yellapragada et al. ........ 709/223 |
| 2011/0004457 A1 * | 1/2011 | Haviv et al. ..................... 703/21 |

* cited by examiner

*Primary Examiner* — Faruk Hamza
*Assistant Examiner* — Tito Pham
(74) *Attorney, Agent, or Firm* — Rabindranath Dutta; Konrad, Raynes, Davda & Victor LLP

(57) ABSTRACT

An apparatus for assigning a device to a network zone comprises a switch component operable to receive an attachment request, port and device name data and device operating characteristics data from the device; and a rules engine operable to acquire the device operating characteristics data from the switch component; the rules engine being operable to apply rules logic to the device operating characteristics data to select a zone for the device. The rules engine may be further operable to apply the rules logic to the port and device name data. The network zone may be a network zone of a fiber channel network.

20 Claims, 3 Drawing Sheets

APPARATUS AND METHOD FOR SWITCH ZONING VIA FIBRE CHANNEL AND SMALL COMPUTER SYSTEM INTERFACE COMMANDS

CROSS-REFERENCE TO RELATED APPLICATIONS

This application claims priority benefits under Title 35, Unites States Code, Section 119(a)-(d) or Section 365(b) from EP 07105662.6, filed on Apr. 4, 2007, by Nicholas O'Leary and John Mark Clifton, and entitled "APPARATUS AND METHOD FOR SWITCH ZONING", which application is incorporated herein by reference in its entirety.

BACKGROUND

1. Field

The disclosure relates to a technology for controlling storage systems, and in particular to a technology for rules-based zoning of a storage networking switch.

2. Background

A fibre channel network makes use of zoning to restrict communication between devices. This is typically done with the switch hardware that comprises the network infrastructure, or fabric.

The basics of fabric zoning in a fibre channel network are described in U.S. Pat. No. 6,765,919, entitled "Method and system for creating and implementing zones within a fibre channel system".

SUMMARY OF THE PREFERRED EMBODIMENTS

Certain embodiments accordingly provide, in a first aspect, an apparatus for assigning a device to a network zone, comprising: a switch component operable to receive an attachment request, port and device name data and device operating characteristics data from said device; and a rules engine operable to acquire said device operating characteristics data from said switch component; said rules engine being operable to apply rules logic to said device operating characteristics data to select a zone for said device.

Preferably, said rules engine is further operable to apply said rules logic to said port and device name data.

Preferably, said network zone is a network zone of a fibre channel network.

Preferably, said device operating characteristics data comprises one of device type data or device vendor identification data.

Preferably, said network comprises a storage area network.

Preferably, said device operating characteristics data comprises a target/initiator status for the device.

In a second aspect, there is provided by certain embodiments a method for assigning a device to a network zone, comprising the steps of: receiving, by a switch component, an attachment request, port and device name data and device operating characteristics data from said device; and acquiring said device operating characteristics data by a rules engine from said switch component; applying, by said rules engine, rules logic to said device operating characteristics data to select a zone for said device.

Preferably, said rules engine is further operable to apply said rules logic to said port and device name data.

Preferably, said network zone is a network zone of a fibre channel network.

Preferably, said device operating characteristics data comprises one of device type data or device vendor identification data.

Preferably, said network comprises a storage area network.

Preferably, said device operating characteristics data comprises a target/initiator status for the device.

In a third aspect, there is provided a data carrier having functional data thereon, said functional data comprising functional computer data structures to, when loaded into a computer system and operated upon thereby, enable said computer system to perform all the steps of a method according to the second aspect.

In a fourth aspect, there is provided a computer program comprising computer program code to, when loaded into a computer system and executed thereon, cause said computer system to perform all the steps of a method according to the second aspect.

BRIEF DESCRIPTION OF THE DRAWINGS

A preferred embodiment will now be described, by way of example only, with reference to the accompanying drawing figures, in which.

DETAILED DESCRIPTION

Figure 1:
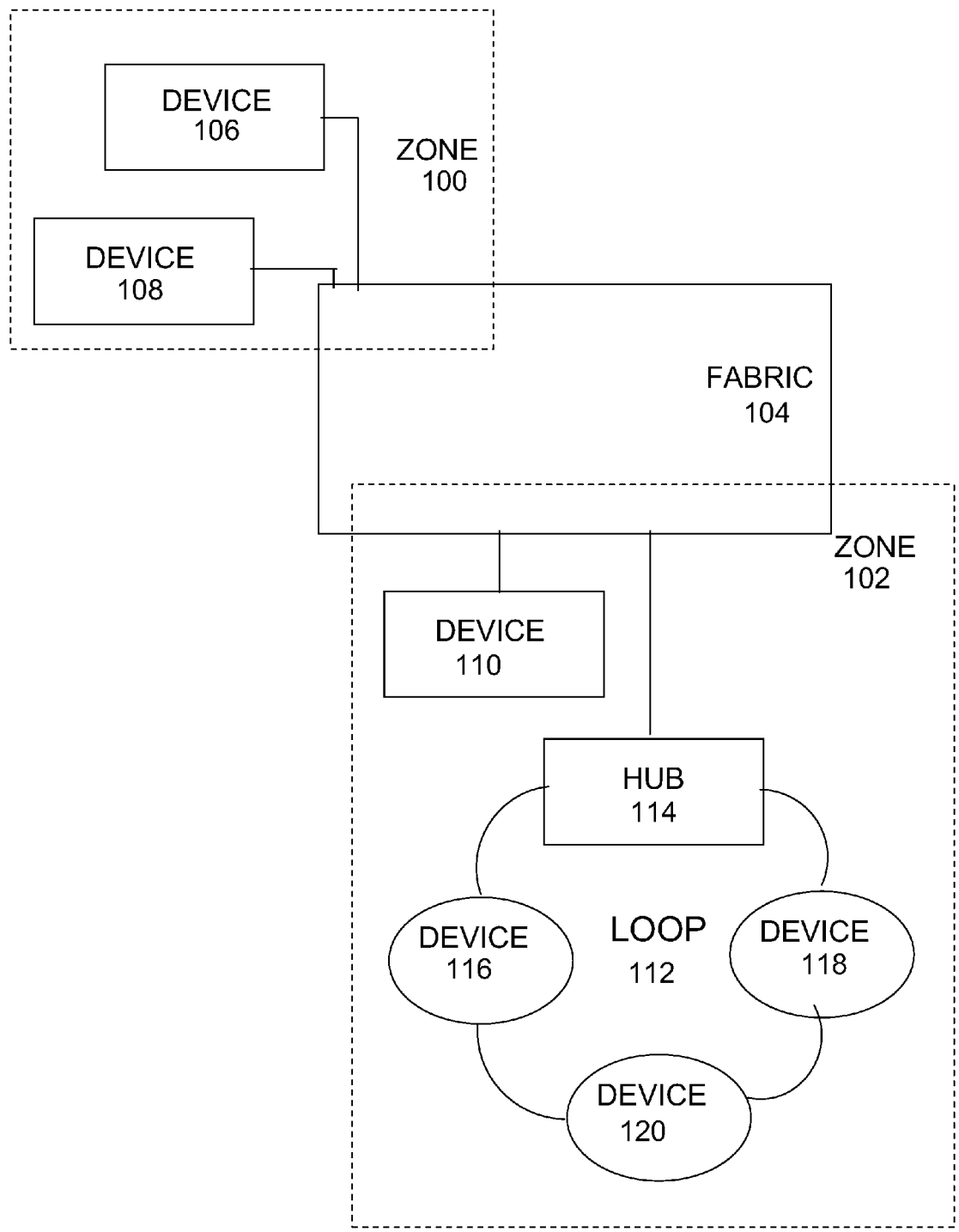
FIG. 1 shows in schematic form an arrangement of apparatus in accordance with the prior art.

Preferred embodiments contemplate a technology for controlling fibre-channel systems, and in particular for providing rules-based zoning of a fibre-channel fabric switch.

With reference to the disclosure of U.S. Pat. No. 6,765,919 and FIG. 1 of the present application, a fibre channel network communication system comprises a fabric 104 and a plurality of devices 106, 108, 110. Fabric 104 is coupled to the various devices 106, 108, 110, and acts as a switching network to allow devices to communicate with each other. Fabric 104 consists of one or more switches.

Devices 106, 108, 110 may be any type of device, such as a computer or a peripheral, and are coupled to the fabric 104 using a point-to-point topology. Fabric 104 is also coupled to loop 112. Loop 112 includes a hub 114 and devices 116, 118, 120, which are coupled in a loop topology.

In FIG. 1, the fibre channel system includes two zones 100 and 102. Zone 100 contains device 106 and device 108. Zone 102 contains device 110 and loop 112. Devices within the same zone may communicate with each other. Thus, for example, devices 106 and 108 may communicate with each other because they are both members of zone 100. Likewise, device 110 and loop 112 may communicate with each other because they are both members of zone 102. However, device 110 cannot communicate with device 106 because device 110 and device 106 are not members of a common zone. Similarly, device 110 cannot communicate with device 108; and loop 112 cannot communicate with either device 106 or device 108.

Zones are created that specify logical groups of devices that may communicate with one another. There are two techniques widely used today to configure the zone:
1) Port Zoning; and
2) World Wide Port Name (WWPN) Zoning.

In Port Zoning, the ports of each switch are used to describe the zone. Any device that is then plugged into a port becomes a member of the zones that port is in.

In WWPN Zoning, each device on the network (such as a storage area network, or SAN) has a globally-unique Worldwide Port Number. Zones are defined as groups of WWPNs, so that it does not matter where in the fabric the device is physically connected.

Port zoning has the advantage that one is able to physically group ports together for particular purposes. However it does not easily allow for expansion when all of the ports are used and it requires careful planning before the network is implemented. It can also easily lead to misconfigurations where the wrong device is plugged into a particular port.

WWPN Zoning has the advantage that one is able to connect a device to the fabric anywhere. However one needs to know the WWPNs before one can connect a device to the fabric.

It would thus be desirable to have a technology for controlling fibre channel systems and, in particular, a technology for more effective and less error-prone zoning of a fibre-channel fabric switch.

A preferred embodiment is suitably implemented in a fibre channel network system, and more particularly in a storage networking system, such as a SAN, employing switching technologies for the fabric infrastructure.

The following describes the sequence of events in a system as illustrated in FIG. 1 when a device connects to a fibre channel network:
1. Device plugs in
2. Device sends a Fabric Login (FLOGI) frame to the switch; the switch now knows WWPN/WWNN (World Wide Node Name) information about device
3. Switch logs into the device using an FC2login frame
4. Device accepts the FC2login
5. Switch logs into device using an FC4login frame
6. Device accepts the FC4login
7. Switch sends SCSI (Small Computer System Interface) inquiries to determine further information about the device
8. Switch logs out of the device.

As can be seen in the sequence above, the switch has information concerning the WWPN and WWNN of the device, which information can be used in WWPN zoning, as in the prior art. The switch also has port information, which can be used for port zoning, as in the prior art. However, the switch also has available to it the SCSI information that can be acquired during step 7, and the preferred embodiments are operable to use this additional information advantageously to assist in assigning the device to a zone.

According to the preferred embodiments, a user is able to configure rules on the switch to determine what zoning is applied to a device. The rules may take the form:

If [CONDITION] then [RESULT]

where CONDITION represents a logic statement regarding the properties of a device, and RESULT represents what action the switch should take with this device. It will be clear to one of ordinary skill in the art that any of the known logical operators (AND, OR, XOR etc.) may also be used in constructing rules logic statements according to the various embodiments.

The properties available for inclusion in the CONDITION comprise those that are available from the SCSI inquiry data, including but not limited to:
  device type;
  vendor information; and
  target/initiator status.

As will be clear to one of ordinary skill in the art, the characteristics may also include device identification data, such as WWPN/WWNN information, and port identification information. Both of these may be used in addition to the device operating characteristics data by a rules engine according to the preferred embodiment.

The uses of the values available for RESULT include, but are not limited to:
  automatically creating zones that include the device and other devices that meet further defined conditions;
  automatically adding the device to existing zones; or
  isolating the device so it is unable to connect to anything else.

The preferred embodiments thus allow for a plug-and-play type of mechanism for use within a fibre-channel network. A user is able to define sets of zoning rules that can be applied whenever a device is connected to the network to determine what zones the device should be a member of.

Figure 2:
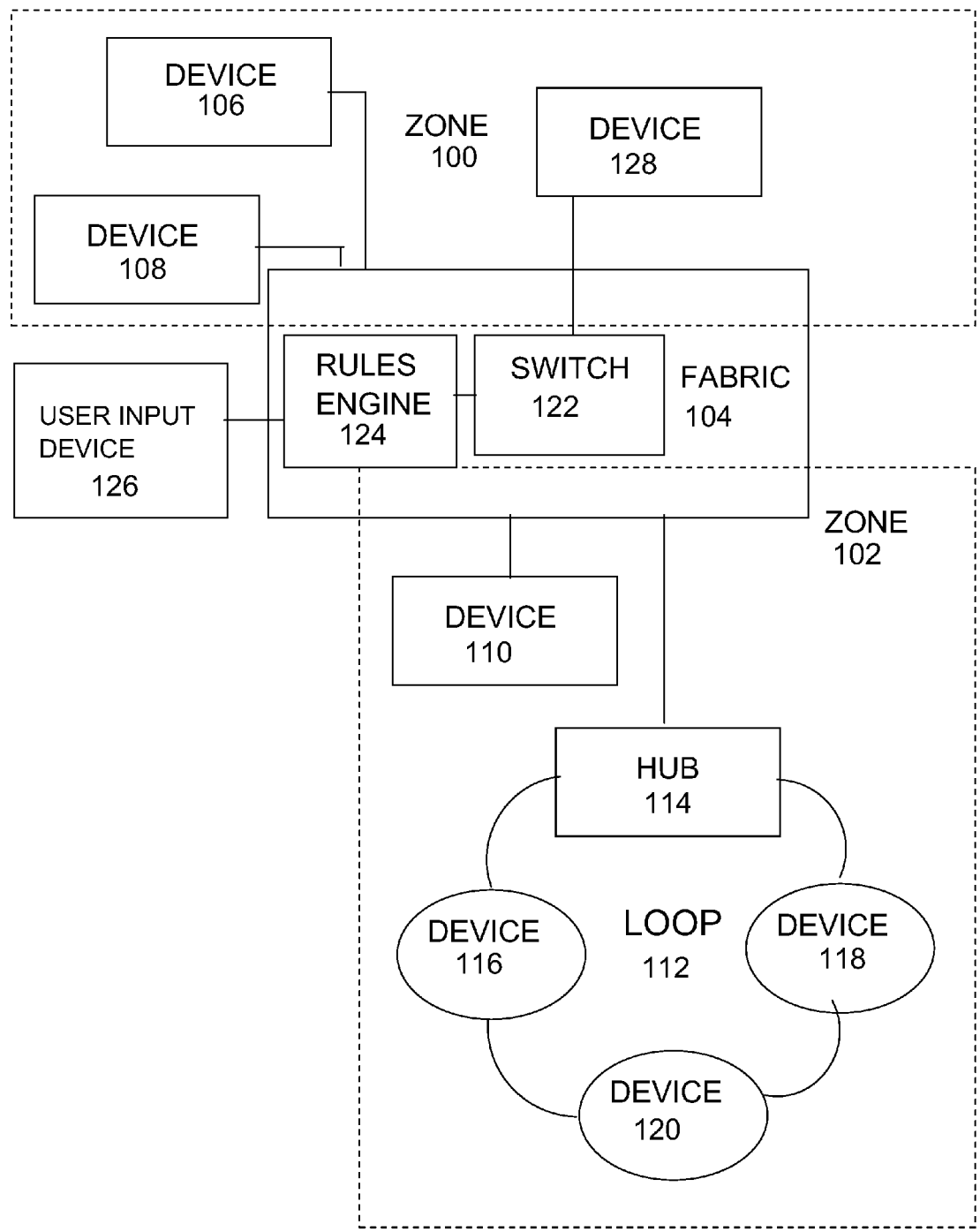
FIG. 2 shows in schematic form an arrangement of apparatus in accordance with a preferred embodiment.

Turning to FIG. 2, which shows an apparatus in accordance with one preferred embodiment, there is shown a system according to FIG. 1, but in which fabric 104 is shown to contain switch 122 and, additionally, rules engine 124. Rules engine 124 is operable in conjunction with switch 122 and user input means 126 to construct zoning rules (as exemplified above) for devices that attach to fabric 104. In FIG. 2, new device 128 has attached to fabric 104 by means of switch 122, and rules engine 124 has applied rules associated with switch 122 according to user input from user input means 126. In this example, as a result of the application of the rules, new device 128 has been assigned to zone 100.

The general concept of rules engines is well known in the art, and needs no further explanation here.

The preferred embodiment in the form of an apparatus or arrangement of apparatus thus advantageously addresses the problem of providing a technology for controlling fibre-channel systems, such as storage networking systems, and in particular for providing rules-based zoning of a storage networking switch.

Figure 3:
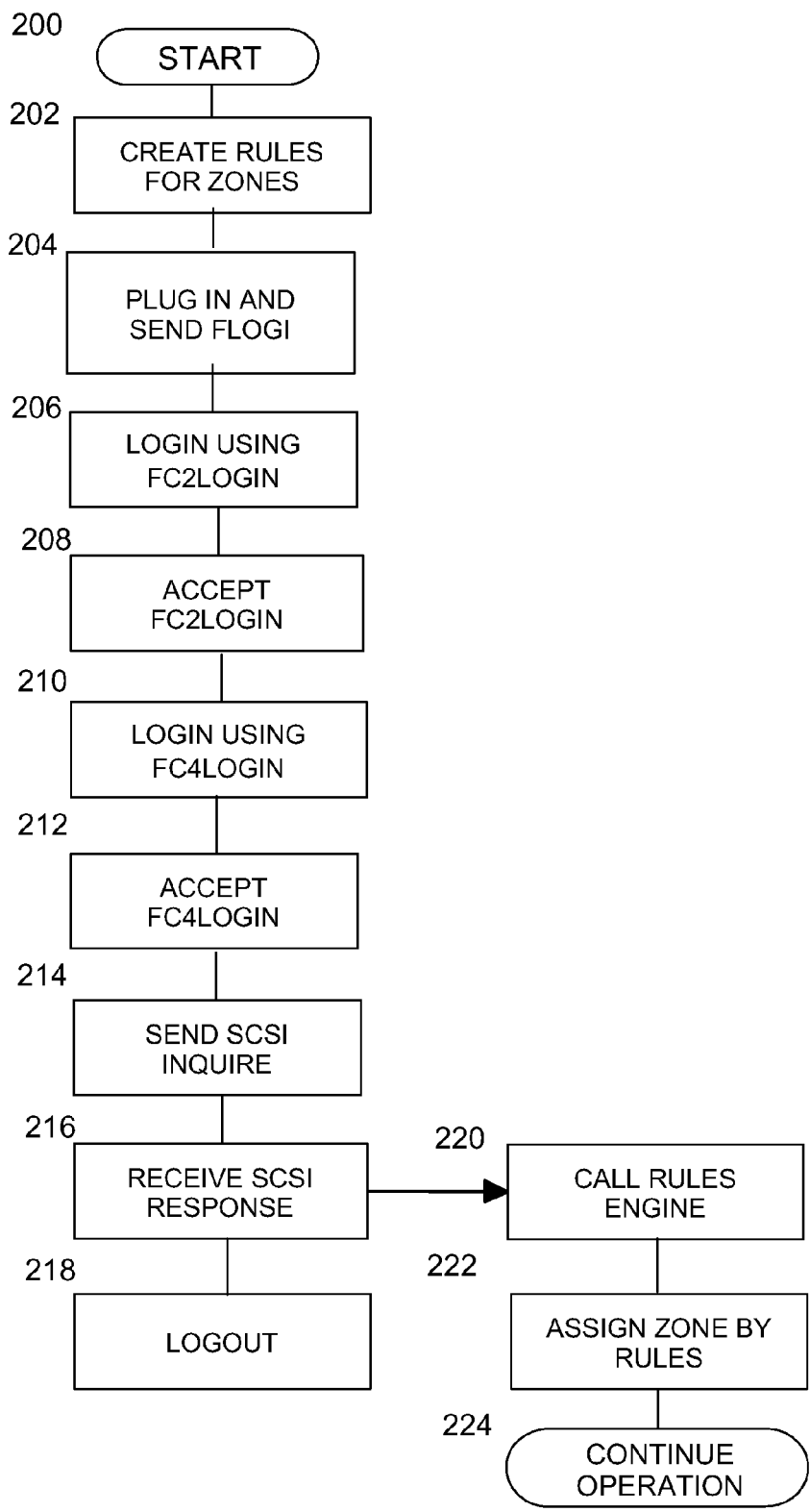
FIG. 3 shows in flowchart form one method or one logic arrangement in which a method of operation according to a preferred embodiment may be implemented

Turning now to FIG. 3, there are shown in flowchart form the steps of a method or logic arrangement according to a preferred embodiment.

In FIG. 3, the method or logic arrangement includes steps beginning at START step 200. At step 202, a user uses the input device 126 in conjunction with rules engine 124 to create zoning rules as described above. At step 204, a new device (for example, device 128) plugs in to the fabric and sends an FLOGI frame to the switch with the WWPN/WWNN information about itself.

At step 206 the switch logs into the device using an FC2login frame, and at step 208, the device accepts the FC2login. At step 210, the switch logs into the device using an FC4login frame, and at step 212, the device accepts the FC4login. The switch sends SCSI inquiries to determine further information about the device at step 214, and at step 216, the switch receives the SCSI response or responses. At step 218, the switch is free to log out of the device. Meanwhile, at step 220, the switch has called the rules engine with the information from the SCSI response or responses, and the rules engine applies the rules to the SCSI information at step 222 in order to assign the device to a zone according to the rules it has been given. At step 224, the system continues operation.

The preferred embodiment in the form of a method or logic arrangement thus advantageously addresses the problem of providing a technology for controlling storage systems, and in particular for providing rules-based zoning of a storage networking switch.

A system according to the preferred embodiment has the advantage of WWPN zoning in which a device is able to connect to any point in the fabric, but without the disadvantage of needing to know the specific WWPNs ahead of time. It is also advantageous in allowing the user to use information beyond the port and WWPN to determine the zoning. Unlike the zoning techniques of the prior art, the embodiments make use of the extended information that is available to the switch, rather than just the port number and WWPN.

Using this extended information to provide sets of user-selectable rules, the zoning can become much more dynamic. Some examples of such rules are:

- all host/initiator systems to be zoned in with a particular storage device;
- all storage devices that identify themselves as IBM DS6000 to be zoned in with all devices that identify themselves as the IBM SAN Volume Controller; and
- all devices with an 'Emulex' Host Bus adapter that are identified as host/initiator systems to be zoned in individual zones with a particular storage device.

It will be clear to one of ordinary skill in the art that all or part of the method of the preferred embodiments may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment may be realized in the form of a computer implemented method of deploying a service comprising steps of deploying computer program code operable to, when deployed into a computer infrastructure and executed thereon, cause said computer infrastructure to perform all the steps of the method.

In a further alternative, the preferred embodiment may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiments.

What is claimed is:

1. A method for assigning a device to a network zone, comprising:
   receiving, by a switch component, an attachment request, port and device name data and device operating characteristics data from said device via:
   a sending of a FC2login frame to said device;
   a sending of a FC4login frame to said device; and
   subsequent to the sending of said FC2login frame and said FC4login frame, a sending of small computer system interface (SCSI) inquiries to said device to determine further information about said device to select a zone for said device;
   acquiring said device operating characteristics data by a rules engine from said switch component; and
   applying, by said rules engine, rules logic to said device operating characteristics data to select said zone for said device, wherein to select said zone for said device, said rules logic includes rules to indicate that all storage devices that provide identification of a selected type are to be zoned in with a selected type of volume controller, and wherein said rules logic includes additional rules to indicate that all devices with a predefined type of host bus adapter that are identified as host or initiator systems are to be zoned in individual zones with a selected type of storage device, wherein said network zone is configured via port zoning, World Wide Port Name zoning, and zoning based on the SCSI inquires, wherein said device is able to connect to any point in said network zone even if a Word Wide Port Name for said device is unavailable.

2. The method of claim 1, wherein said rules logic includes additional rules to indicate that all host or initiator systems are to be zoned in with a selected type of storage device.

3. The method of claim 1, wherein said applying of said rules logic isolates said device such that said device is unable to connect to any other element.

4. The method of claim 1, wherein said device operating characteristics data includes:
   information on device type;
   vendor information;
   target or initiator status;
   World Wide Port Name information;

World Wide Node Name information;
port identification information; and
SCSI information.

5. The method of claim 1, wherein a first zone includes two devices, and a second zone includes an existing device and a loop comprising a hub with a plurality of devices, wherein in said loop said hub is connected to a first device that is connected to a second device that is connected to a third device that is connected to said hub, wherein a new device is placed in said first zone based on applying said rules logic to device operating characteristics of said new device, and wherein each of the two devices of the first zone are coupled to a fabric via a point-to-point topology, and wherein the fabric is also coupled to the hub.

6. A computer readable storage device including computer program code for assigning a device to a network zone, wherein the computer program code when loaded into a computer system and executed thereon, cause said computer system to perform:
receiving, by a switch component, an attachment request, port and device name data and device operating characteristics data from said device via:
a sending of a FC2login frame to said device;
a sending of a FC4login frame to said device; and
subsequent to the sending of said FC2login frame and said FC4login frame, a sending of small computer system interface (SCSI) inquiries to said device to determine further information about said device to select a zone for said device;
acquiring said device operating characteristics data by a rules engine from said switch component; and
applying, by said rules engine, rules logic to said device operating characteristics data to select said zone for said device, wherein to select said zone for said device, said rules logic includes rules to indicate that all storage devices that provide identification of a selected type are to be zoned in with a selected type of volume controller, and wherein said rules logic includes additional rules to indicate that all devices with a predefined type of host bus adapter that are identified as host or initiator systems are to be zoned in individual zones with a selected type of storage device, wherein said network zone is configured via port zoning, World Wide Port Name zoning, and zoning based on the SCSI inquires, wherein said device is able to connect to any point in said network zone even if a Word Wide Port Name for said device is unavailable.

7. The computer readable storage device of claim 6, wherein said rules logic includes additional rules to indicate that all host or initiator systems are to be zoned in with a selected type of storage device.

8. The computer readable storage device of claim 6, wherein said applying of said rules logic isolates said device such that said device is unable to connect to any other element.

9. The computer readable storage device of claim 6, wherein said device operating characteristics data includes:
information on device type;
vendor information;
target or initiator status;
World Wide Port Name information;
World Wide Node Name information;
port identification information; and
SCSI information.

10. The computer readable storage device of claim 6, wherein a first zone includes two devices, and a second zone includes an existing device and a loop comprising a hub with a plurality of devices, wherein in said loop said hub is connected to a first device that is connected to a second device that is connected to a third device that is connected to said hub, wherein a new device is placed in said first zone based on applying said rules logic to device operating characteristics of said new device, and wherein each of the two devices of the first zone are coupled to a fabric via a point-to-point topology, and wherein the fabric is also coupled to the hub.

11. A method for deploying computing infrastructure for assigning a device to a network zone, comprising integrating computer program code into a machine, wherein the computer program code in combination with the machine is capable of performing:
receiving, by a switch component, an attachment request, port and device name data and device operating characteristics data from said device via:
a sending of a FC2login frame to said device;
a sending of a FC4login frame to said device; and
subsequent to the sending of said FC2login frame and said FC4login frame, a sending of small computer system interface (SCSI) inquiries to said device to determine further information about said device to select a zone for said device;
acquiring said device operating characteristics data by a rules engine from said switch component; and
applying, by said rules engine, rules logic to said device operating characteristics data to select said zone for said device, wherein to select said zone for said device, said rules logic includes rules to indicate that all storage devices that provide identification of a selected type are to be zoned in with a selected type of volume controller, and wherein said rules logic includes additional rules to indicate that all devices with a predefined type of host bus adapter that are identified as host or initiator systems are to be zoned in individual zones with a selected type of storage device, wherein said network zone is configured via port zoning, World Wide Port Name zoning, and zoning based on the SCSI inquires, wherein said device is able to connect to any point in said network zone even if a Word Wide Port Name for said device is unavailable.

12. The method for deploying computing infrastructure of claim 11, wherein said rules logic includes additional rules to indicate that all host or initiator systems are to be zoned in with a selected type of storage device.

13. The method for deploying computing infrastructure of claim 11, wherein said applying of said rules logic isolates said device such that said device is unable to connect to any other element.

14. The method for deploying computing infrastructure of claim 11, wherein said device operating characteristics data includes:
information on device type;
vendor information;
target or initiator status;
World Wide Port Name information;
World Wide Node Name information;
port identification information; and
SCSI information.

15. The method for deploying computing infrastructure of claim 11, wherein a first zone includes two devices, and a second zone includes an existing device and a loop comprising a hub with a plurality of devices, wherein in said loop said hub is connected to a first device that is connected to a second device that is connected to a third device that is connected to said hub, wherein a new device is placed in said first zone based on applying said rules logic to device operating characteristics of said new device, and wherein each of the two devices of the first zone are coupled to a fabric via a point-to-point topology, and wherein the fabric is also coupled to the hub.

16. A system for assigning a device to a network zone, comprising:
   a memory; and
   a processor coupled to the memory, wherein the processor performs operations, the operations comprising:
   receiving, by a switch component, an attachment request, port and device name data and device operating characteristics data from said device via:
      a sending of a FC2login frame to said device;
      a sending of a FC4login frame to said device; and
      subsequent to the sending of said FC2login frame and said FC4login frame, a sending of small computer system interface (SCSI) inquiries to said device to determine further information about said device to select a zone for said device;
   acquiring said device operating characteristics data by a rules engine from said switch component; and
   applying, by said rules engine, rules logic to said device operating characteristics data to select said zone for said device, wherein to select said zone for said device, said rules logic includes rules to indicate that all storage devices that provide identification of a selected type are to be zoned in with a selected type of volume controller, and wherein said rules logic includes additional rules to indicate that all devices with a predefined type of host bus adapter that are identified as host or initiator systems are to be zoned in individual zones with a selected type of storage device, wherein said network zone is configured via port zoning, World Wide Port Name zoning, and zoning based on the SCSI inquires, wherein said device is able to connect to any point in said network zone even if a Word Wide Port Name for said device is unavailable.

17. The system of claim 16, wherein said rules logic includes additional rules to indicate that all host or initiator systems are to be zoned in with a selected type of storage device.

18. The system of claim 16, wherein said applying of said rules logic isolates said device such that said device is unable to connect to any other element.

19. The system of claim 16, wherein said device operating characteristics data includes:
   information on device type;
   vendor information;
   target or initiator status;
   World Wide Port Name information;
   World Wide Node Name information;
   port identification information; and
   SCSI information.

20. The system of claim 16, wherein a first zone includes two devices, and a second zone includes an existing device and a loop comprising a hub with a plurality of devices, wherein in said loop said hub is connected to a first device that is connected to a second device that is connected to a third device that is connected to said hub, wherein a new device is placed in said first zone based on applying said rules logic to device operating characteristics of said new device, and wherein each of the two devices of the first zone are coupled to a fabric via a point-to-point topology, and wherein the fabric is also coupled to the hub.

* * * * *